United States Patent
Bashkansky et al.

[11] Patent Number: 6,034,804
[45] Date of Patent: Mar. 7, 2000

[54] RAPID, HIGH-RESOLUTION SCANNING OF FLAT AND CURVED REGIONS FOR GATED OPTICAL IMAGING

[75] Inventors: Mark Bashkansky, Alexandria, Va.; Michael Duncan, Cheverly, Md.; John Reintjes, Alexandria, Va.

[73] Assignee: The United States of America as represented by the Secretary of the Navy, Washington, D.C.

[21] Appl. No.: 09/050,964

[22] Filed: Mar. 31, 1998

[51] Int. Cl.[7] .................................................. G02B 26/08
[52] U.S. Cl. .......................... 359/201; 359/202; 359/205
[58] Field of Search .................................... 359/201, 202, 359/205

[56] References Cited

U.S. PATENT DOCUMENTS

| | | | |
|---|---|---|---|
| 4,030,830 | 6/1977 | Holly | 356/109 |
| 4,373,774 | 2/1983 | Dubroeucq et al. | 359/202 |
| 4,629,319 | 12/1986 | Clarke et al. | 356/237 |
| 4,920,385 | 4/1990 | Clarke et al. | 356/237 |
| 5,035,476 | 7/1991 | Ellis et al. | 359/202 |
| 5,504,345 | 4/1996 | Bartunek et al. | 250/559.4 |
| 5,623,928 | 4/1997 | Wright et al. | 128/661.01 |
| 5,667,373 | 9/1997 | Wright et al. | 128/660.07 |

OTHER PUBLICATIONS

*Publication*, "Subsurface Defect Detection in Ceramic Materials Using Optical Gating Techniques", by P.R. Battle et al., *Optical Engineering*, vol. 35 (4), pp. 1119–1123 (1996).
*Publication*, "Subsurface Defect Detection in Ceramics Using an Optical Gated Scatter Reflectometer", by Mark Bashkansky et al., *Journal of American Ceramic Society*, vol. 79, No. 5, pp. 1397–1400 (1996).
*Publication*, "Subsurface Defect Detection in Ceramics by High–Speed High–Resolution Optical Coherent Tomography", by M. Bashkansky et al., *Optics Letters*, vol. 22, No. 1, pp. 61–63 (1997).
*Publication*, "Femtosecond Optical Ranging in Biological Systems", by Fujimoto et al., *Optics Letters*, vol. 11, No. 3, pp. 150–152, (1986).
*Publication*, "Optical Coherence—Domain Reflectometry: A New Optical Evaluation Technique", by Youngquist et al., *Optics Letters*, vol. 12, No. 3, pp. 158–160, (1987).
*Publication*,"Coherent Optical Tomography of Microscopic Inhomogeneities in Biological Tissues", by Gelkonov et al., *JETP Letters*, vol. 61, No. 2, pp. 158–162, (1995).

*Primary Examiner*—James Phan
*Attorney, Agent, or Firm*—Barry A. Edelberg; Edward F. Miles

[57] ABSTRACT

A scanning system for scanning in first and second dimensions a desired surface topology of a sample, the scanning device comprising: a light source for producing a collimated light beam; a first scanning device responsive to the collimated light beam from the light source for producing a first scanned beam in a first dimension with a constant optical path length; and a second scanning device coupled between the first scanning device and the sample for focusing and scanning the first scanned beam in a second dimension onto the surface region of the sample to cause the collimated light beam to scan the surface topology of the sample with a constant optical path length in each of the first and second dimensions of the desired topology of the sample. In a second embodiment of the invention, a beam of light is focused by a first lens before a scanner and the scanner is rotated. Second and third lenses arranged in a 4-f combination are used to image rotated focal spots along a spherical convex surface of a sample while the optical path length stays constant. Slow scanning in other dimensions can be performed by mechanical means.

2 Claims, 3 Drawing Sheets

RAPID, HIGH-RESOLUTION SCANNING OF FLAT AND CURVED REGIONS FOR GATED OPTICAL IMAGING

BACKGROUND OF THE INVENTION

1. Field of the Invention

The present invention relates to optical scanning and particularly to the use of special scanning techniques wherein high resolution near-surface images can be acquired rapidly in either a flat or a curved surface geometry.

2. Description of the Related Art

It has been previously demonstrated that ultrafast optical gating techniques can be used for defect detection in advanced ceramic materials. One of the most promising techniques, due to its low cost and ease of implementation, is optical coherence tomography (OCT). This technique is based on low coherence fiber interferometry and can produce high resolution subsurface images. However, to make devices based on OCT practical, the image acquisition time should be fast (hopefully approaching video rates). This was recognized and an OCT technique was modified so that the image acquisition time was reduced to ~300 msec. This was accomplished at a price of reduced spatial resolution since the scattered light was not always collected at the focus of the lens. Another disadvantage of this technique is that the image is always collected in the X-Z plane, where Z represents the depth into the sample and X represents one transverse dimension.

SUMMARY OF THE INVENTION

Accordingly, an object of the present invention is to provide an improved scanning device.

Another object of the invention is to apply special optical scanning methods to improve optical techniques used for detecting scattered laser radiation from near-surface structures, defects, or imperfections in ceramic and other translucent, but highly scattering materials.

Another object of the invention is to provide an improved scanning device wherein the improvements are achieved by reducing image acquisition time while keeping spatial resolution high for various surface topologies.

Another object of the invention is to provide a scanning device which produces a two-dimensional line scan of a sample and maintains a constant optical path length during the entire scan.

A further object of the invention is to provide an improved scanning device which uses special scanning techniques so that high resolution near-surface images can be acquired rapidly in either a flat or a curved surface geometry.

These and other objects of the invention are achieved by providing an optical scanning system for developing high-resolution, near-surface images of a sample by reducing image acquisition time while keeping spatial resolution high for various surface topologies. By using special scanning techniques, high resolution near-surface images can be acquired rapidly in either one or two dimensions in either a flat or a curved surface geometry with a constant optical path length.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts through the several views and wherein.

DETAILED DESCRIPTION OF THE PREFERRED EMBODIMENTS

Figure 1:
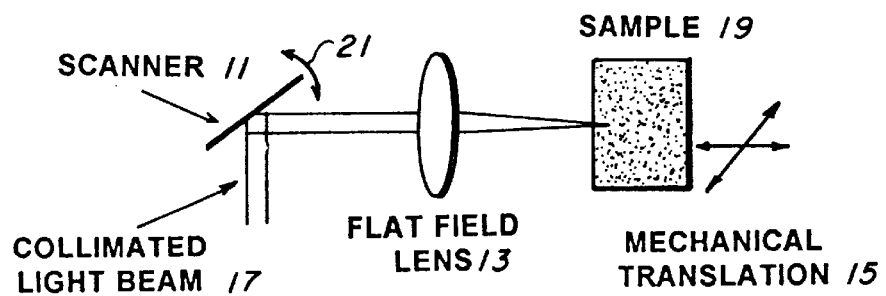
FIG. 1 shows a standard scanning technique for a single scan in one dimension of a plane.

The purpose of this invention is to improve on the previously reported OCT techniques by providing a special optical scanning arrangement, in combination with fast PZT modulation in the reference or the signal arm of the interferometer, such that high resolution images may be acquired rapidly in a flat or curved surface topology either parallel or perpendicular to the surface. The improvement results in a practical device capable of obtaining images in a flat or curved topology, parallel or perpendicular to the surface, rapidly and with high resolution. Additionally, three-dimensional surface profiling can also be accomplished on curved surfaces without gating, in a scanning confocal microscope configuration.

In typical OCT the pathlength between the reference and signal beams in the reference and signal arms of the interferometer is rapidly varied to produce a Doppler shift between the beams. If the sample is moved to accomplish this, then the return signal always originates in the focus of the collecting lens. However, the sample in general can only be moved with a mechanical translation stage, which limits the image collection time to >10 seconds. Furthermore, the images can only be acquired perpendicular to the surface. A technique used in the prior art reduced the image collection time to ~300 msec. This was accomplished by stretching an optical fiber in the reference arm by approximately 3 mm with a PZT. However, this has the side effect of moving the gating depth through the focus of the image collecting lens. The waist size of a Gaussian beam is given by the following equation:

$$w_z^2 = w_0^2 \left[ 1 + \left( \frac{\lambda z}{\pi w_0^2} \right)^2 \right]$$

where $W_z$ is the beam waist size as a function of depth Z, $W_o$ is the minimum beam waist size and $\lambda$ is the wavelength. Using this equation at a wavelength of 1 $\mu$m the beam size has to be at least 30 $\mu$m to have no significant increase in size over a depth of 3 mm. This method therefore greatly limits the possible spatial resolution and restricts the scans to depth cross-sections.

The purpose of this invention is to improve on these typical OCT techniques in a number of ways. In order to enable optical scanning of the signal beam, the modulation of the signal must be separated from the motion of either the sample or the light beams. This is accomplished by winding a length of fiber on a special high speed-low voltage PZT and changing the fiber length by only ~3 wavelengths. Besides achieving very high modulation frequencies (>300 kHz), this also separates the modulation from any translation of the sample and enables optical scanning in any direction. The focus of the scan can now be scanned with fast, commercially available galvanometer mirrors in such a way that the focal size does not change and the total optical path length (OPL) from the signal fiber output to the focus stays constant. If this condition is satisfied, then the gated image will contain the scanned area at the best possible resolution. Three scanning techniques of interest have been identified, which will now be discussed by referring to the drawings.

1. A Plane At Any Angle to the Surface Using One Optical Scanner.

FIG. 1 shows a schematic diagram of a scanning system or arrangement wherein an optical fast scan is performed in one dimension parallel to the surface, while a slower motion is performed in the other two dimensions by mechanical translation stages.

The scanning system of FIG. 1 is a focused scanning system which allows a collimated light beam to be focused and scanned in one dimension. As will be explained, the scanning system or arrangement in FIG. 1 is used to focus a collimated light beam, such as a laser beam, to a spot on a sample by rotating the collimated part of the beam before it reaches the lens. That scanning can be accomplished in a straight line and the focus will move on a planar surface in that straight line.

The scanning system of FIG. 1 includes a scanner 11 comprising a rotating scanner (not shown) and a scanner mirror (not shown) attached to and rotated by the rotating scanner, a flat field lens 13 and mechanical translation stage 15. The scanner 11 can be a galvanometer which includes the scanner mirror. The flat field lens 13 is a focusing lens.

An input collimated signal light beam 17 from some collimated light source (not shown) incident on the center of the mirror of the scanner 11 is reflected by the mirror through the focusing lens 13. The lens 13 focuses the collimated light beam to a spot one focal length (1-f) away on a sample 19. The scanner 11 is rotated by any suitable means (such as a shaft in an exemplary galvanometer—not shown) in the directions shown by double arrows 12 to produce a linear scan across the sample 19. The mechanical translation stages 15 move the sample in the other two dimensions by means well known in the art.

In operation, when the distance from the center of a scanning galvanometer mirror on the scanner 11 to the flat field lens 13 is equal to the focal length of the lens 13, the input light beam 17 will scan a flat line parallel to the surface of the sample 19 in the focal plane of the lens 13 without changing the OPL. A flat field lens 13 is designed to keep the focus at a minimum in this arrangement. However, even though the beam 17 is collimated, it has to be at the center of the scanning mirror of the scanner 11 for constant OPL. This is different than the requirement for confocal scanning microscopy, where only the focus position is important and not the OPL.

2. A Plane Parallel to the Surface Using Two Optical Scanners.

To enable even faster scanning in the plane parallel to the surface, as in confocal scanning microscopy, a different system or arrangement is required. The simple scanning system used in confocal scanning microscopy cannot be adapted because the OPL is not constant during the scan. Therefore, a second scanning system, shown in FIG. 2, is utilized together with the scanning system shown in FIG. 1 to enable fast gated scanning in a plane.

Figure 2:
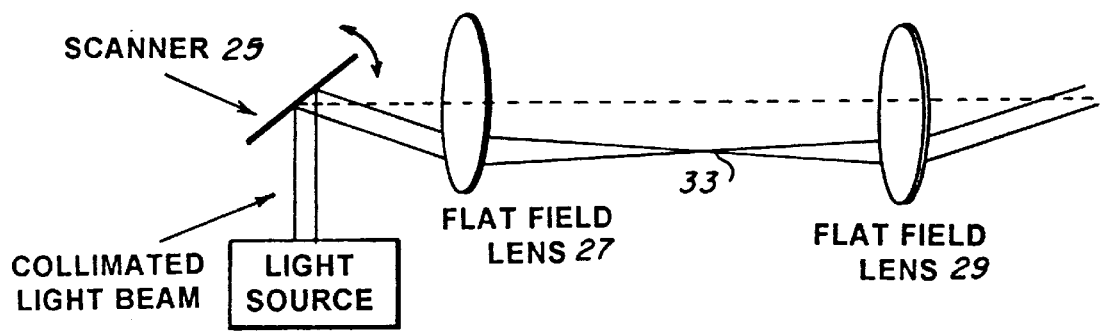
FIG. 2 shows a 4-f lens system which allows scanning in a linear direction from collimated beam to collimated beam.

FIG. 2 shows the optical arrangement, including a second scanner 25, similar in structure and operation to the scanner 11 in FIG. 1. The scanner 25 has to be used to keep a constant path length for a light beam, when utilized with the first or focusing scanning system of FIG. 1, to make a two-dimensional line scan and keep the optical path length constant during that entire two-dimensional line scan. More specifically. FIG. 2 shows a transverse dimension and the scanning within that transverse dimension which, when combined with the system of FIG. 1, allows a complete two-dimensional scan across a flat surface. In other words, FIG. 2 shows the optical arrangement that must be used to keep the optical path length constant for that second dimension of scanning.

In FIG. 2, a 4-f lens system 27 and 29 is used together with a scanning galvanometer mirror in the scanner 25, in the dimension perpendicular to that used in FIG. 1, to produce fast scanning in two dimensions. In the arrangement shown in FIG. 2, the OPL stays constant throughout the scan, while the scan is performed always in the focus of the lens 13 in FIG. 1.

In the operation of the system of FIG. 2, a collimated light beam 31, which is incident on and reflected from the scanning mirror in the scanner 25, is scanned across the face of a flat field lens 27. A second flat field lens 29 is also located in the 4-f lens arrangement. Both the first and second flat field lenses 27 and 29 are similar in operation to the flat field lens 13 in FIG. 1.

In the 4-f lens arrangement of FIG. 2, the lens 27 is located one focal length (1-f) away from the scanner 25, the distance between lenses 27 and 29 is two focal lengths (2-f), and the distance between the lens 29 and the point of combination with the scanner 11 in FIG. 1 (to be explained in FIG. 3) is one focal length (1-f) away. Thus, in FIG. 2 there are four focal lengths (4-f) distance between the scanner 25 in FIG. 2 and the scanner 11 in FIG. 1, which would be combined with the light output of FIG. 2. (To be explained in FIG. 3.)

The flat field lens 13 in FIG. 1 and the two flat field lenses 27 and 29 in FIG. 2 are all focusing lenses, arbitrary in size, and are designed to have a minimal aberration when they are used to focus collimated light down to a focal spot at one focal length (1-f) away from the lenses. For example, the lens 27 focuses the light beam 31 down to a focal spot 33 which is located one focal length (1-f) from each of the lenses 27 and 29.

Figure 3:
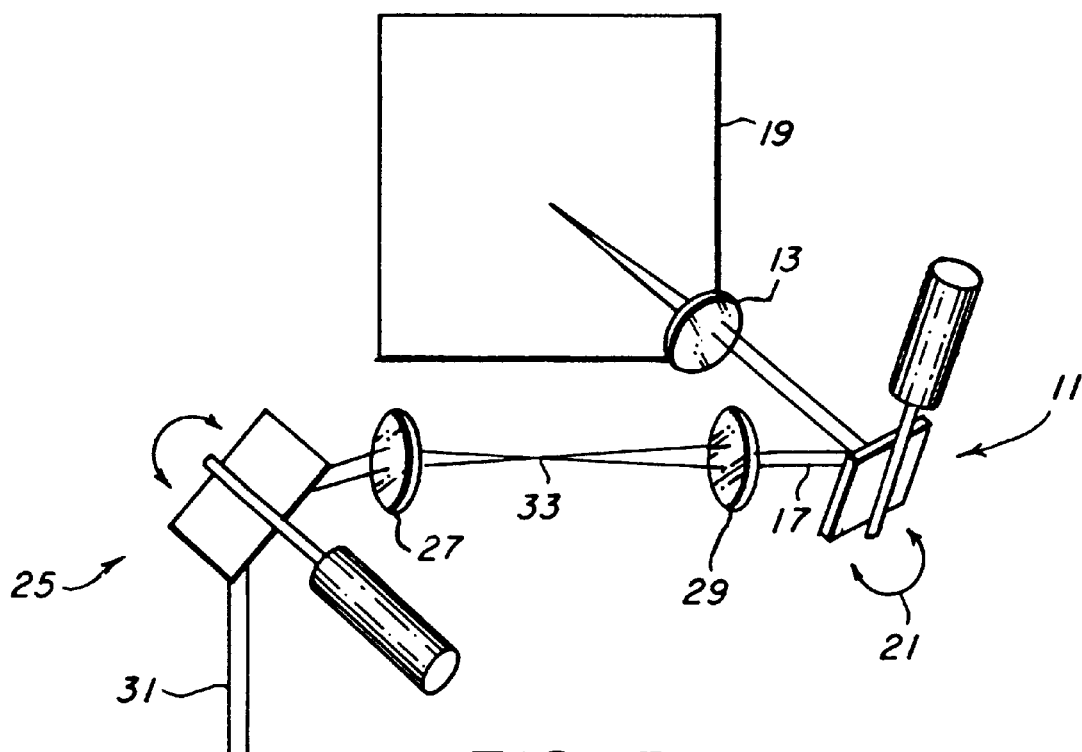
FIG. 3 is a three-dimensional representation of FIGS. 1 and 2 combined to show scanning in both the X and Y scan directions onto a flat plane, keeping the optical path length constant.

FIG. 3 is a three-dimensional representation of the combination of FIGS. 1 and 2, combined in such a way that two-dimensional scanning occurs. The scanning occurs along a flat plane surface, a planar surface, and the focal spot will trace along that planar surface and the optical path length will stay constant over that entire scan over that flat surface.

As shown in FIG. 3, the structural elements of FIG. 2 are placed just ahead of the structural elements of FIG. 1 to produce a combined system which produces a two-dimensional line scan of the sample 19 while keeping an optical path length constant during the entire scan over the sample 19.

As explained before, the scanner 11, flat field lens 13, mechanical translation stage 15 (FIG. 1) and sample 19 are the components from FIG. 1 and operate as explained in relation to FIG. 1 to focus a light beam and allow that focused light beam to scan across a sample in one dimension; while the scanner 25, and flat field lenses 27 and 29 are the components from FIG. 2 and operate as explained in relation to FIG. 2 to produce a scan in a second dimension in such a way to keep the optical path lengths constant along the focus on the sample itself over the entire scan.

In the operation of the system of FIG. 3, the collimated light beam 31 is incident on the mirror of the rotating scanner 25 and is deflected off of that mirror and passes through flat field lens 27 which focuses the beam to the focal spot 33. That beam at the focal spot 33 grows again as it approaches the flat field lens 29. After it passes through the lens 29, it is in a collimated state and is deflected off of the scanner 11 (FIG. 1) to the flat field lens 13 (FIG. 1). The light beam 31 is focused by the lens 13 before reaching the flat plane of the sample 19 that is to be scanned over.

In summary, FIGS. 1, 2 and 3 show and describe the scanning of a planar surface, with FIG. 1 dealing with a scan in a first dimension, FIG. 2 dealing with a scan in a second dimension and FIG. 3 dealing with a scan in both of the first and second dimensions.

3. A Spherical Convex Surface Using One Optical Scanner and a Slower Rotating Mechanical Device.

Figure 4:
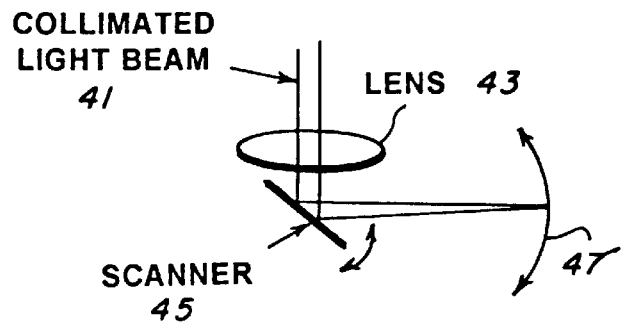
FIG. 4 shows a technique for performing a linear scan along a spherical concave surface with a constant optical path length along that concave surface.

To produce either gated or non-gated confocal scans of spherical objects such as ball bearings, a special scanning system is required. As shown in FIG. 4, only a single scanner and a lens is sufficient to produce a scan of a spherical concave surface. As depicted in FIG. 4, the focus is tracing a concave sphere during a scan. This type of scanning is well known and is used to study various concave objects such as the interior of the eye.

In the operation of the system of FIG. 4, a collimated light beam 41 is focused by a flat field lens 43 onto a scanner 45 similar to the scanner 11 (FIG. 1) or scanner 25 (FIG. 2) to scan over a concave surface 47 in one dimension. To scan in two dimensions, FIG. 4 could be combined with the system shown in FIG. 2. Such a combination of scanners would produce a linear scan in one dimension (using FIG. 2) and a scan over a spherical convex surface in the other dimension (using FIG. 4).

Figure 5:
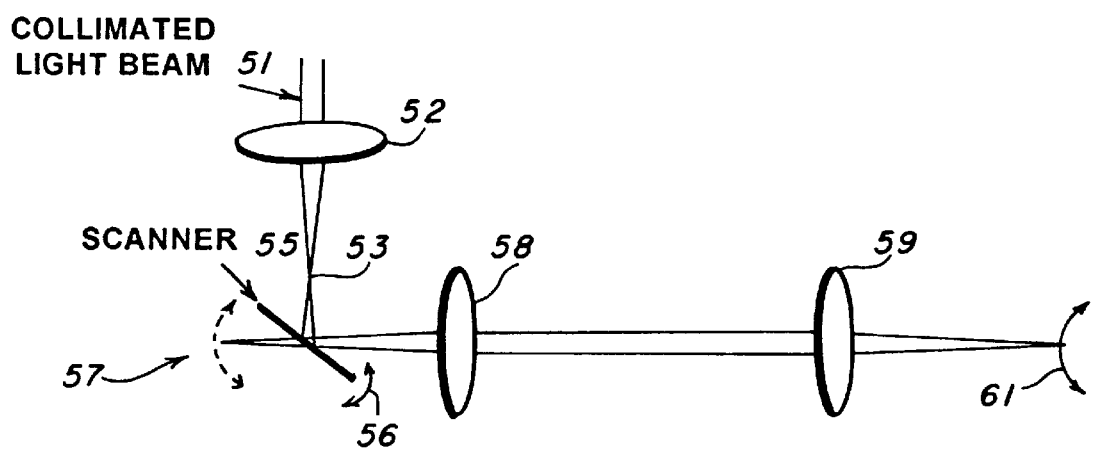
FIG. 5 shows a technique for performing a linear scan along a spherical convex surface, with a constant optical path length along that convex surface.

Referring now to FIG. 5, FIG. 5 shows a technique for performing a linear scan along a spherical convex surface, with a constant optical path length along that convex surface. To produce a scan of a convex surface, an arrangement different from that of FIG. 4 is required.

In FIG. 5 a flat field lens 52 forms a focus before a scanner 55. Scanner 55 is similar to scanner 11 (FIG. 1) or scanner 25 (FIG. 2). The expanding light beam is rotated by scanner 55 as shown by the double arrows 56. The focus 53 of light beam 51 that occurs before the scanner 56 is placed one focal length away from lens 58. Because of the geometry used in this configuration, it is possible to draw a virtual line that represents how the focus spot 53 moves as seen by lens 58. That line is represented by the dotted line 57. In other words, dotted line 57 describes the motion of the focal spot 53 as seen by lens 58. The combined distance from the virtual line shown as the dotted line 57 to the line 61 forms, in combination with lenses 58 and 59, a 4-f system. The 4-f system includes the distance from focus 53 to lens 58 (which is the same distance as from virtual line 57 to lens 58), the distance between lenses 58 and 59, and the distance from lens 59 to line 61. The distance from the focus 53 to the lens 58 is one focal length, the distance between lenses 58 and 59 is two focal lengths, and the distance between lens 59 and line 61 is one focal length, where the focal lengths of both lenses are the same and equal to f.

Because the combination of virtual line 57, lenses 58 and 59 and line 61 forms a 4-f system, the virtual line 57 will transform into the convex line 61 in the focus of the lens 59. This transformation only works in a 4-f lens system. If a single 2f to 2f lens imaging system (not shown) were used instead, the line 61 traced by the scanning beam 41 would not be spherical. The explanation for this is based on the observation that a single lens transforms Z positions in space asymmetrically from 0 to 2f into positions from 2f to ∞ and vice versa. However, a 4-f two lens system transforms 0 to f positions into f to 2f positions symmetrically, preserving the spherical nature of the line 61. The slow scanning in other dimensions can be performed by mechanical means. The radius of curvature of the convex scan shown in FIG. 5 can be adjusted by changing the relative position of focus 53 and scanner 55. Making the distance between focus 53 and scanner 55 large increases the radius of curvature of line 61, and making that distance small decreases the radius of curvature of line 61. As an example of a scan over a spherical surface, a prototype device performed a 2×2 mm scan on the surface of a ball bearing in less than 1 sec.

Even though these scanning techniques were developed for gated optical imaging, they can also be applied for confocal scanning microscopy on curved and flat surfaces.

Advantages and New Features of the Invention

The above-described implementation of optical scanning techniques allows fast image acquisition in various surface topologies while keeping high spatial resolution and while keeping a constant optical path length during the scan. When applied to a convex surface, these optical techniques can also dramatically improve the resolution of images obtained with a confocal scanning microscope.

Alternatives

Aspherical lenses, or other lens combinations may be designed to improve the focus of the signal beam. Two-dimensional gated imaging may also be feasible with some other surface geometry. An optical polarizer may be used in conjunction with the gating techniques to further reduce noise due to the surface reflection or to study birefringences of the sample. Lens pairs in the 4-f imaging system described in FIG. 5 do not have to be of equal focal length. If the focal lengths are different, but if distances between different elements are adjusted properly, there is the potential to magnify or reduce the final radius of curvature over the initial radius of curvature, while still keeping a convex scan in which the OPL is constant.

Therefore, what has been described in a first preferred embodiment of the invention is an optical scanning system for developing high-resolution, near-surface images from a desired surface topology of a sample, the optical scanning system comprising: a light source for producing a collimated light beam; a first optical system for directing the collimated beam to a first position on a first optical axis; a first scanner device having a first center portion for scanning the collimated light beam from the light source through the first optical system to the first position on the first optical axis with a constant path length in a first dimension; a second scanner device having a second center portion for scanning the scanned collimated light beam from the first portion on the first optical axis along a second optical axis orthogonal to the first optical axis; and a second optical system for focusing the collimated light beam onto the desired surface topology in a second dimension; the first and second scanner devices cooperatively operating to cause the collimated light beam to scan the desired surface topology of the sample with a focused constant optical path length in both of the first and second dimensions of the sample.

In a second preferred embodiment of the invention, a scanning system for scanning in first and second dimensions a convex surface of a sample is disclosed. The scanning system comprises: a light source for producing a collimated light beam; a scanning mirror having a scanning surface; a first focusing lens for focusing the collimated light beam before the scanning mirror; second and third focusing lenses optically aligned with each other, the combination of the scanning surface of the scanning mirror, the first, second and third focusing lenses and the convex surface of the sample forming a 4-f system so that the focus of the first lens transforms into the convex surface in the focus of the third focusing lens, the second focusing lens positioned such that that its focus coincides with the on-axis virtual location of the focused collimated light beam from the first focusing lens as seen in the scanning mirror, the third focusing lens producing at its output a focus of the beam which follows a curved line that lies on the surface of the spherical convex surface, the focus maintaining a constant optical path length; and translation means coupled to the sample for translating the sample to produce a two-dimensional scan of the surface of the sample.

It should therefore readily be understood that many modification and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. An optical scanning system for developing high-resolution, near-surface images from a desired surface topology of a sample, said optical scanning means comprising:

a light source for producing a collimated light beam;

a first optical system for directing the collimated beam to a first position on a first optical axis;

a first scanner device having a fist center portion for scanning the collimated light beam from said light source through said first optical system to said first position on said first optical axis with a constant path length in a first dimension;

said first scanner device is comprised of a scanner and a mirror having said first center portion and being attached to said scanner;

said first optical system comprises:
 first and second focusing lenses;
 said mirror and said first and second focusing lenses forming a 4-f lens system, said first focusing lens being disposed one focal length away from said first center portion, said first and second focusing lenses being disposed two focal lengths away from each other, and said second focusing lens being disposed one focal length away from said first portion on said first optical axis;

a second scanner device having a second center portion for scanning the scanned collimated light beam from said first portion on said first optical axis along a second optical axis orthogonal to said first optical axis, wherein said second scanner device is comprised of a scanner and a mirror having a second center portion and being attached to said scanner; and a second optical system for focusing the collimated light beam onto the desired surface topology in a second dimension, wherein said second optical system comprises a third focusing lens disposed one focal length away from said second scanner device and one focal length away from said sample;

said first and second scanner devices cooperatively operating to cause the collimated light beam to scan the desired surface topology of the sample with a focused constant optical path length in both of said first and second dimensions of said sample.

2. The optical scanning system of claim 1 wherein:

said light source is selected from the group consisting of a light-emitting diode and a laser.

\* \* \* \* \*